US010652353B2

(12) United States Patent
Dinan et al.

(10) Patent No.: US 10,652,353 B2
(45) Date of Patent: May 12, 2020

(54) TECHNOLOGIES FOR AUTOMATIC PROCESSOR CORE ASSOCIATION MANAGEMENT AND COMMUNICATION USING DIRECT DATA PLACEMENT IN PRIVATE CACHES

(71) Applicant: Intel Corporation, Santa Clara, CA (US)

(72) Inventors: James Dinan, Hudson, MA (US); Venkata Krishnan, Ashland, MA (US); Srinivas Sridharan, Bangalore (IN); David A. Webb, Groton, MA (US)

(73) Assignee: Intel Corporation, Santa Clara, CA (US)

( * ) Notice: Subject to any disclaimer, the term of this patent is extended or adjusted under 35 U.S.C. 154(b) by 1096 days.

(21) Appl. No.: 14/864,369

(22) Filed: Sep. 24, 2015

(65) Prior Publication Data

US 2017/0094010 A1 Mar. 30, 2017

(51) Int. Cl.
*G06F 15/16* (2006.01)
*H04L 29/08* (2006.01)
*G06F 15/173* (2006.01)

(52) U.S. Cl.
CPC .... *H04L 67/2852* (2013.01); *G06F 15/17337* (2013.01)

(58) Field of Classification Search
CPC ......... G05F 15/16; G06F 9/46; H04L 67/2852
See application file for complete search history.

(56) References Cited

U.S. PATENT DOCUMENTS 9,298,618 B1 * 3/2016 Wentzlaff ............ G06F 12/0813
2008/0244231 A1 * 10/2008 Kunze .................. G06F 9/3828
712/207

2011/0280250 A1 11/2011 Inoue
2012/0030364 A1 2/2012 Morimoto
2014/0321462 A1 * 10/2014 Kancherla ............... H04L 45/72
370/389

FOREIGN PATENT DOCUMENTS

WO 2014-204495 12/2014

OTHER PUBLICATIONS

International Search Report for PCT application No. PCT/US2016/048415, dated May 24, 2017 (3 pages).
Written Opinion for PCT application No. PCT/US2016/048415, dated May 24, 2017 (7 pages).

* cited by examiner

*Primary Examiner* — Normin Abedin
(74) *Attorney, Agent, or Firm* — Barnes & Thornburg LLP (57) ABSTRACT

Technologies for communication with direct data placement include a number of computing nodes in communication over a network. Each computing node includes a many-core processor having an integrated host fabric interface (HFI) that maintains an association table (AT). In response to receiving a message from a remote device, the HFI determines whether the AT includes an entry associating one or more parameters of the message to a destination processor core. If so, the HFI causes a data transfer agent (DTA) of the destination core to receive the message data. The DTA may place the message data in a private cache of the destination core. Message parameters may include a destination process identifier or other network address and a virtual memory address range. The HFI may automatically update the AT based on communication operations generated by software executed by the processor cores. Other embodiments are described and claimed.

19 Claims, 4 Drawing Sheets

TECHNOLOGIES FOR AUTOMATIC PROCESSOR CORE ASSOCIATION MANAGEMENT AND COMMUNICATION USING DIRECT DATA PLACEMENT IN PRIVATE CACHES

STATEMENT REGARDING FEDERALLY SPONSORED RESEARCH

This invention was made with Government support under contract number H98230-13-D-0124 awarded by the Department of Defense. The Government has certain rights in this invention.

BACKGROUND

High-performance computing (HPC) applications typically execute calculations on computing clusters that include many individual computing nodes connected by a high-speed network fabric. Typical computing clusters may include hundreds or thousands of individual nodes. Each node may include one or more many-core processors, co-processors, processing accelerators, or other parallel computing resources. A typical computing job therefore may be executed by a large number of individual processes distributed across each computing node and across the entire computing cluster.

Processes within a job may communicate data with each other using a message-passing communication paradigm. For computing clusters using high-speed network fabrics, an increasingly large proportion of message processing time may be caused by internal latency associated with moving message data across I/O or memory buses of the individual computing node. Thus, overall performance may be improved by improving communication locality, that is, by delivering network data closer to the processor core or other computing resources of the computing node. Current technologies such as Intel® Data Direct I/O (DDIO) allow I/O devices such as network controllers to place data directly in a shared last-level cache, bypassing main memory. However, DDIO may not be used for systems lacking a shared last-level cache.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
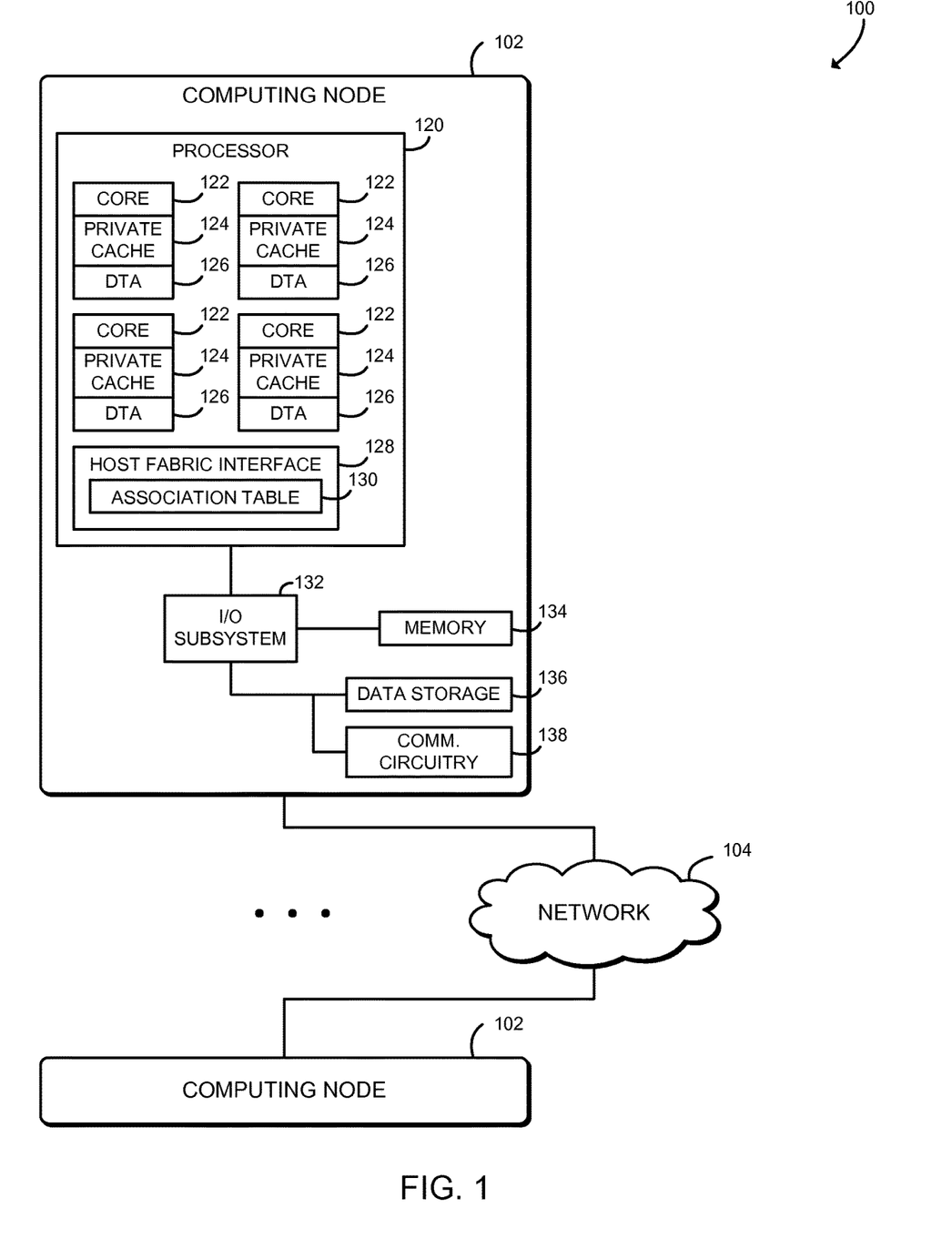
FIG. 1 is a simplified block diagram of at least one embodiment of a system for communication using direct data placement.

Referring now to FIG. 1, in an illustrative embodiment, a system 100 for communication using direct data placement includes a number of computing nodes 102 in communication over a network 104. In use, as discussed in more detail below, each computing node 102 may execute software that generates communication operations, such as message passing operations, one-sided operations, or other operations. In response to those operations, a host fabric interface of the computing node 102 maintains an association table that associates network addresses and virtual memory address ranges with the particular processor cores that originated the operations. When a message is received from a remote device, the host fabric interface looks up the network address (e.g., MPI process rank or other networked process identifier) and virtual memory address range of the message in the association table and, if found, engages or otherwise causes a data transfer agent of the associated destination processor core to receive the message data. The data transfer agent may copy the message data directly into a private cache of the destination processor core. Thus, the system 100 may enable direct data placement for processor architectures that do not include a shared last-level cache. Directly placing the message data into the private cache may improve performance and energy consumption of the system 100 by reducing cache misses and otherwise improving communication locality. Additionally, direct data placement may be used to enable efficient implementations of thread wakeups when data arrives in the private cache, which may be used to implement certain parallel programming models.

Each computing node 102 may be embodied as any type of computation or computer device capable of performing the functions described herein, including, without limitation, a computer, a multiprocessor system, a server, a rack-mounted server, a blade server, a laptop computer, a notebook computer, a network appliance, a web appliance, a distributed computing system, a processor-based system, and/or a consumer electronic device. As shown in FIG. 1, each computing node 102 illustratively includes a processor 120, an input/output subsystem 132, a memory 134, a data storage device 136, and a communication subsystem 138. Of course, the computing node 102 may include other or additional components, such as those commonly found in a server device (e.g., various input/output devices), in other embodiments. Additionally, in some embodiments, one or more of the illustrative components may be incorporated in, or otherwise form a portion of, another component. For example, the memory 134, or portions thereof, may be incorporated in the processor 120 in some embodiments.

The processor 120 may be embodied as any type of multi-core processor capable of performing the functions described herein. The illustrative processor 120 is a four-core processor, however in other embodiments the processor 120 may be embodied as any multi-core processor, coprocessor, digital signal processor, microcontroller, or other processor or processing/controlling circuit. The processor 120 illustratively includes four processor cores 122, each of which is an independent processing unit capable of executing programmed instructions. In some embodiments, each of the processor cores 122 may be capable of hyperthreading; that is, each processor core 122 may support execution on two or more logical processors or hardware threads. Although the illustrative processor 120 includes four processor cores 122, in other embodiments the processor 120 may include many more cores (e.g., 61 cores, 72 cores, or more). Additionally, although the illustrative computing node 102 includes a single multi-core processor 120, the technologies disclosed herein are also applicable to computing nodes 102 having two or more processors 120 (including two or more single-core processors 120).

Each of the processor cores 122 is coupled to a private cache 124. Each private cache 124 may be embodied as any type of volatile or non-volatile storage capable of performing the functions described herein. The private cache 124 may store instructions, operands, or other data accessed by the associated processor core 122. The contents of the private cache 124 are not directly accessible by the other processor cores 122. In some embodiments, the private cache 124 may be included within a larger memory hierarchy including additional private and/or shared caches. Storing data in the private cache 124, which may be logically closer to the processor core 122 than other levels of the memory hierarchy, may improve performance (e.g., by providing faster memory access, reducing cache misses, or providing other improvements). For example, the private cache 124 may be embodied as a private L1 and/or L2 cache. In some embodiments, the processor 120 may include a separate cache shared by all of the processor cores 122 (e.g., a shared L3 cache or last-level cache). Updates to the private cache 124 may be propagated to other private caches 124 and/or to other levels of the memory hierarchy using a cache coherency protocol. Of course, in some embodiments, the processor 120 may not include a shared cache.

As shown in the illustrative embodiment, each of the processor cores 122 and/or private caches 124 is coupled to a data transfer agent 126. Each data transfer agent 126 may place received message data into the private cache 124 of the associated processor core 122 or, in some embodiments, into any other appropriate level of the memory hierarchy of the computing node 102. Each data transfer agent 126 may be embodied as hardware, firmware, software, or any combination of hardware, firmware, and/or software capable of performing the functions described herein. For example, the data transfer agent 126 may be embodied as a functional block or other component coupled to or integrated in the associated processor core 122. As described further below, in some embodiments each data transfer agent 126 may further interact with software executed by the processor cores 122.

The processor 120 further includes a host fabric interface 128. The host fabric interface 128 may be embodied as any communication interface, such as a network interface controller, communication circuit, hardware component, logic block, electronic circuitry, device, or collection thereof, capable of enabling communications between the processor cores 122 and other remote computing nodes 102 and/or other remote devices over the network 104. The host fabric interface 128 may be configured to use any one or more communication technology and associated protocols (e.g., InfiniBand®, Intel® Omni-Path Architecture, Ethernet, etc.) to effect such communication. As further described above, the host fabric interface 128 may cause message data to be placed directly in a private cache 124 associated with the appropriate processor core 122. For example, the host fabric interface 128 may engage the hardware and/or software data transfer agent 126 associated with the destination processor core 122 to place the data. The host fabric interface 128 maintains an association table 130 that associates one or more message parameters with particular processor cores 122. For example, the association table 130 may associate network addresses (e.g., MPI process ranks or other process identifiers) and virtual memory addresses to processor cores 122. The association table 130 may be embodied as any type of volatile or non-volatile storage (e.g., memory, registers, or other storage) capable of storing associations between message data and the processor cores 122.

The memory 134 may be embodied as any type of volatile or non-volatile memory or data storage capable of performing the functions described herein. In operation, the memory 134 may store various data and software used during operation of the computing node 102 such as operating systems, applications, programs, libraries, and drivers. The memory 134 may be positioned at the level of the memory hierarchy that is logically furthest from the processor cores 122 of the computing node 102. The memory 134 is communicatively coupled to the processor 120 via the I/O subsystem 132, which may be embodied as circuitry and/or components to facilitate input/output operations with the processor 120, the memory 134, and other components of the computing node 102. For example, the I/O subsystem 132 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 132 may form a portion of a system-on-a-chip (SoC) and be incorporated, along with the processors 120, the memory 134, and other components of the computing node 102, on a single integrated circuit chip. The data storage device 136 may be embodied as any type of device or devices configured for short-term or long-term storage of data such as, for example, memory devices and circuits, memory cards, hard disk drives, solid-state drives, or other data storage devices. Thus, the computing node 102 includes one or more computer-readable storage media that may include one or more instructions that, when executed by the processor 120, cause the computing node 102 to perform various operations as described herein. The computer-readable storage media may be embodied as, for example, the memory 134, the data storage device 136, and/or other storage media of the computing node 102.

The communication subsystem 138 of the computing node 102 may be embodied as any communication interface, such as a communication circuit, device, or collection thereof, capable of enabling communications between the computing nodes 102 and/or other remote devices over the network 104. The communication subsystem 138 may be configured to use any one or more communication technology (e.g., wired or wireless communications) and associated protocols (e.g., InfiniBand®, Intel® Omni-Path Architecture, Ethernet, Bluetooth®, Wi-Fi®, WiMAX, etc.) to effect such communication.

Additionally, although the illustrative computing node 102 shows the host fabric interface 128 as integrated in the processor 120, it should be understood that in other embodiments the host fabric interface 128 may be included in or coupled to other components of the computing node 102. For example, in some embodiments the host fabric interface 128 may be included in the I/O subsystem 132, included in the communication subsystem 138, coupled directly to the processor 120, or coupled to the I/O subsystem 132.

As discussed in more detail below, the computing nodes 102 may be configured to transmit and receive data with each other and/or other devices of the system 100 over the network 104. The network 104 may be embodied as any number of various wired and/or wireless networks. For example, the network 104 may be embodied as, or otherwise include, a switched fabric network, a wired or wireless local area network (LAN), a wired or wireless wide area network (WAN), a cellular network, and/or a publicly-accessible, global network such as the Internet. As such, the network 104 may include any number of additional devices, such as additional computers, routers, and switches, to facilitate communications among the devices of the system 100.

Figure 2:
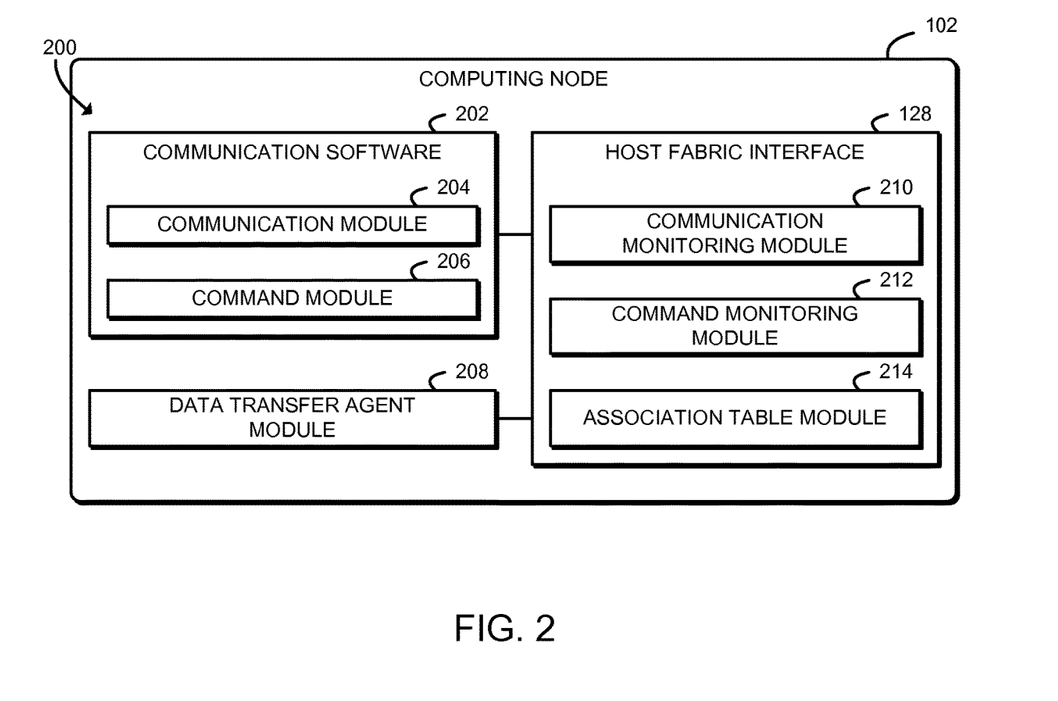
FIG. 2 is a simplified block diagram of at least one embodiment of an environment that may be established by a computing node of FIG. 1.

Referring now to FIG. 2, in an illustrative embodiment, each computing node 102 establishes an environment 200 during operation. The illustrative environment 200 includes communication software 202, a data transfer agent module 208, a communication monitoring module 210, a command monitoring module 212, and an association table module 214. The various modules of the environment 200 may be embodied as hardware, firmware, software, or a combination thereof. For example, each of the modules, logic, and other components of the environment 200 may form a portion of, or otherwise be established by, the processor 120, the host fabric interface 128, or other hardware components of the computing node 102. As such, in some embodiments, any one or more of the modules of the environment 200 may be embodied as a circuit or collection of electrical devices (e.g., a data transfer agent circuit 208, a communication monitoring circuit 210, etc.).

The communication software 202 may be embodied as any application software, operating system software, communication middleware, or other software configured to send and receive communication messages with remote computing devices. The communication software 202 may include one or more processes, threads, ranks, or other software entities that send and receive message data. Each of those software entities may be associated with a network address such as a process rank, process identifier, or other network address that is used for sending and/or receiving messages. The communication software 202 may also include system management software or other software to configure and otherwise manage data communication. In some embodiments, those functions may be performed by one or more sub-modules, such as a communication module 204 and/or a command module 206.

The data transfer agent module 208 is configured to determine a destination memory hierarchy level and to store received message data at the determined destination memory hierarchy level. As described above, the computing node 102 includes variety of different memory storage areas organized into a hierarchy. The memory hierarchy generally varies from relatively large and slow storage positioned at a relatively large logical distance from the processor core 122 (e.g., the system memory 134 accessible across one or more memory buses) to relatively small and fast storage positioned at a relatively small logical distance from the processor core 122 (e.g., the private cache 124 which may be on the same die as the processor core 122). In some embodiments, the computing node 102 may include other, intermediate memory locations such as a shared L3 or last-level cache. Thus, the data transfer agent module 208 may store the received message data in one of the private caches 124, in the system memory 134, in a shared cache, or in any other appropriate location in the memory hierarchy. The data transfer agent module 208 may determine the destination in the memory hierarchy based on one or more cache placement policies, which may be configurable by a user of the computing node 102.

The communication monitoring module 210 is configured to receive incoming communication messages from remote computing devices such as remote computing nodes 102. The communication monitoring module 210 may receive the communication messages using the communication subsystem 138. The communication monitoring module 210 may be embodied as hardware and/or software of the host fabric interface 128.

The command monitoring module 212 is configured to intercept or otherwise receive communication operations originated by the communication software 202. The communication operations may include, for example, message-passing operations such as send or receive operations, as well as one-sided operations such as get or put. The communication operations may also include software commands to manage the association table 130. The command monitoring module 212 may be embodied as hardware and/or software of the host fabric interface 128.

The association table module 214 is configured to match incoming message data against the association table 130, and to engage the data transfer agent 126 of matching processor cores 122 to receive the incoming message data. The association table 130 includes a number of association entries. Each association entry associates one or more parameters of the incoming message with a particular destination processor core 122. For example, each association entry may associate a particular network address (e.g., an MPI rank, a process ID, a thread ID, or other networked process identifier) and a virtual memory address range (e.g., a receive buffer) with the destination processor core 122. The association table module 214 may determine a process identifier and virtual address range for an incoming message and search the association table 130 for a matching association entry. If an association entry is not found, the association table module 214 may store the incoming message data in memory shared by all processor cores 122 of the computing node 102, such as the memory 134 and/or a shared last-level cache.

The association table module 214 is further configured to manage the association table 130 based on intercepted communication operations or software commands. The association table module 214 is configured to determine the network address, virtual memory address range, and the processor core 122 associated with each communication operation. The association table module 214 is configured to generate or update appropriate association entries in the association table 130. The association table module 214 is also configured to update the association table 130 based on software commands received from the communication software 202. The association table module 214 may be embodied as hardware and/or software of the host fabric interface 128.

Figure 3:
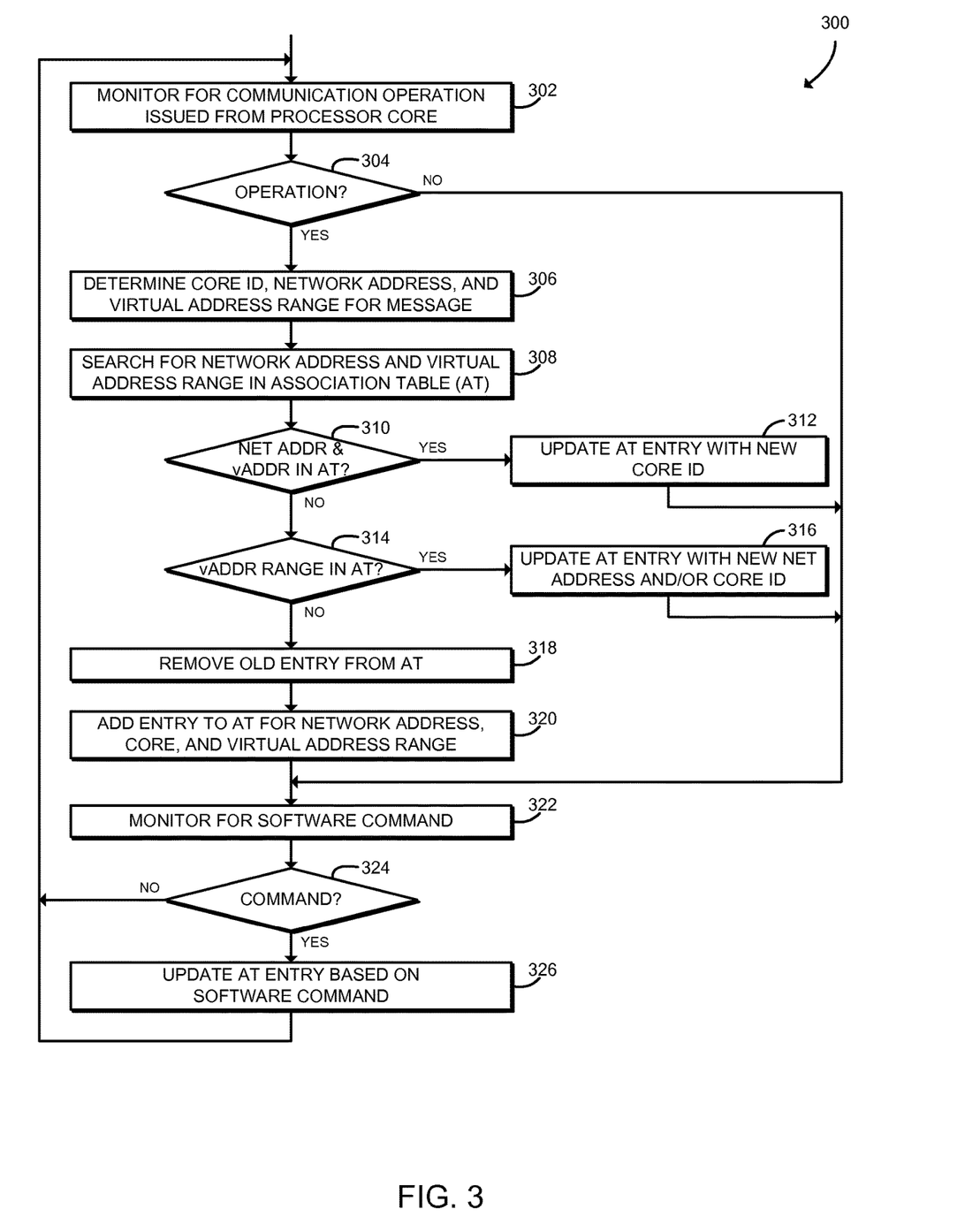
FIG. 3 is a simplified flow diagram of at least one embodiment of a method for managing associations between messages and processor cores that may be executed by a computing node of FIGS. 1 and 2.

Referring now to FIG. 3, in use, each computing node 102 may execute a method 300 for managing associations between communications and processor cores 122. The method 300 may be executed using any combination of hardware and/or software resources of the computing node 102. For example, one or more parts of the method 300 may be executed by the host fabric interface 128 of the computing node 102. The method 300 begins in block 302, in which the computing node 102 monitors for a communication operation issued from a processor core 122. The communication operation may be embodied as any request to send or receive data with a remote computing device such as another computing node 102. For example, the communication operation may be embodied as a message-passing operation such as a send message or receive message request, a collective operation, a one-sided communication operation such as a get or put request, or other communication operation. The computing node 102 may use any technique to monitor for communication operations. For example, the computing node 102 may detect function calls or other commands to initiate communication operations generated by the communication software 202. As another example, the host fabric interface 128 may detect data associated with communication operations as the data is transmitted by the associated processor core 122.

In block 304, the computing node 102 determines whether a communication operation has been detected. If not, the method 300 jumps ahead to block 322, described below. If a communication operation is detected, the method 300 advances to block 306.

In block 306, the computing node 102 determines a processor core 122 identifier, a network address, and a virtual address range in memory associated with the communication operation. The processor core 122 identifier identifies the particular processor core 122 of the processor 120 associated with the communication operation, such as the sending or receiving processor core 122. The network address associates a software process, thread, or other entity executed by the computing node 102 with the communication operation. The network address may be embodied as any identifier that may be associated with the communication operation and the executing entity, such as a message passing interface ("MPI") rank, an operating system process identifier ("pid"), a thread identifier, or other identifier. The virtual address range is associated with the source and/or destination of the data for the communication operation. For example, the virtual address range may identify an in-memory buffer used to store data to be transmitted or received. The computing node 102 may use any technique to determine the processor core 122 identifier, the network address, and the virtual memory address range. For example, the computing node 102 may determine that information from software such as the communication software 202. As another example, the host fabric interface 128 may determine that information from message data received from the processor cores 122.

In block 308, the computing node 102 searches the association table 130 for the network address and the virtual address range determined in block 306. In block 310, the computing node 102 determines whether the association table 130 includes an association entry matching the network address and the virtual address range. If not, the method 300 branches ahead to block 314, described below. If the association table 130 includes an association entry matching the network address and the virtual address range, the method 300 advances to block 312. In block 312, the computing node 102 updates the association entry of the association table 130 with the processor core 122 identifier, if the processor core 122 identifier has changed. For example, in some embodiments a particular process or thread associated with a network address and a virtual address range may migrate between processor cores 122 during the lifetime of the process. Updating the association entry of the association table 130 may ensure that message data is placed in the proper private cache 124 after a process or thread migrates to a new processor core 122. After updating the association table 130 if needed, the method 300 advances to block 322, described below.

Referring back to block 310, if an association entry matching both the network address and the virtual address is not found in the association table 130, the method 300 advances to block 314, in which the computing node 102 determines whether the virtual address range determined in block 306 is found in the association table 130. If not, the method 300 advances to block 318, described below. If the virtual address range is found in the association table 130, the method 300 branches to block 316.

In block 316, the computing node 102 updates the association entry of the association table 130 matching the virtual address range with the network address, if the network address has changed and/or with the processor core 122 identifier, if the processor core 122 identifier has changed. For example, in some embodiments a new process or thread having a new network address may take ownership of a particular virtual memory address range, such as a buffer. The new process or thread may be executed by a different processor core 122. Updating the association entry of the association table 130 may ensure that message data is placed in the proper private cache 124. After updating the association table 130 if needed, the method 300 advances to block 322, described below.

Referring back to block 314, if the virtual address range is not found in the association table 130, the method 300 advances to block 318, in which the computing node 102 may remove one or more old association entries from the association table 130. The computing node 102 may remove an association entry if, for example, the association table 130 is full or otherwise over capacity (e.g., all available table entries have been filled). The computing node 102 may remove association entries that have not matched received data for some time. For example, as described below, the association table 130 may include a timestamp for each association entry, and that timestamp may be updated when the association entry matches received data. The computing node 102 may use any strategy for removing old association entries, such as removing the oldest entries or removing entries older than a threshold time.

In block 320, the computing node 102 adds a new association entry to the association table 130. The association entry associates the network address and the virtual memory address range with the processor core 122 identifier determined above in connection with block 306. As further described below in connection with FIG. 4, the association table 130 may be used to place incoming message data in the private cache 124 associated with the proper processor core 122. After updating the association table 130, the method 300 advances to block 322.

In block 322, the computing node 102 monitors for a software command to update the association table 130. The software command may be generated by the communication software 202 of the computing node 102. For example, the software command may be generated by application software, communication middleware, operating system software, system management software, or other software. In block 324, the computing node 102 determines whether a software command has been received. If not, the method 300 loops back to block 302 to continue monitoring for communication operations. If a software command is received, the method 300 advances to block 326, in which the computing node 102 updates the association table 130 based on the software command. The computing node 102 may allow software to modify any or all data stored in the association table 130. For example, when a process or thread is migrated to a new processor core 122, software such as the operating system or communication middleware may invalidate or modify corresponding association entries in the association table 130. After updating the association table 130, the method 300 loops back to block 302 to continue monitoring for communication operations.

Figure 4:
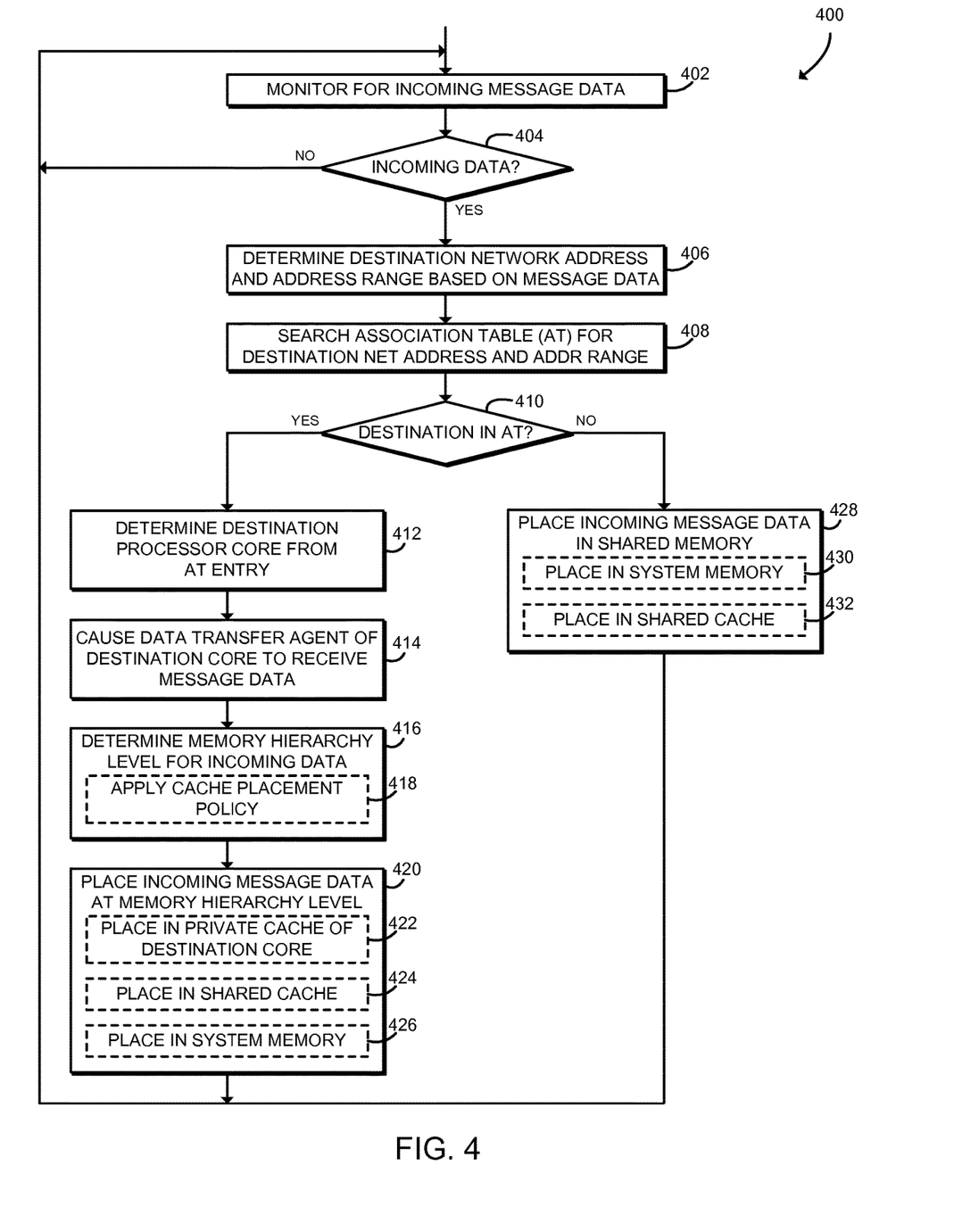
FIG. 4 is a simplified flow diagram of at least one embodiment of a method for communication using direct data placement that may be executed by a computing node of FIGS. 1 and 2.

Referring now to FIG. 4, in use, each computing node 102 may execute a method 400 for communication using direct data placement in private caches 124. The method 400 may be executed using any combination of hardware and/or software resources of the computing node 102. For example, one or more parts of the method 400 may be executed by the host fabric interface 128 of the computing node 102. The method 400 begins in block 402, in which the computing node 102 monitors for incoming message data received from a remote computing device such as another computing node 102. The message data may be received by the computing node 102, for example, in response to a message-passing operation such as a message receive request, a collective operation, a one-sided communication operation such as a get request or a put request, or other communication operation. In some embodiments, the host fabric interface 128 of the computing node 102 may monitor for incoming message data. In block 404, the computing node 102 determines whether message data has been received. If not, the method 400 loops back to block 402 to continue monitoring for incoming message data. If message data has been received, the method 400 advances to block 406.

In block 406, the computing node 102 determines a destination network address and virtual address range based on the received message data. The network address identifies a software process, thread, or other entity executed by the computing node 102 that is the destination of the message data. The network address may be embodied as any identifier that may be associated with the message data, such as a message passing interface ("MPI") rank, an operating system process identifier ("pid"), a thread identifier, or other identifier. The virtual address range is also associated with the destination of the message data. For example, the virtual address range may identify an in-memory buffer used to store received message data. The computing node 102 may use any technique to determine the network address and the virtual memory address range. For example, the host fabric interface 128 may extract or otherwise determine the network address and the virtual memory address range by analyzing the message data itself.

In block 408, the computing node 102 searches the association table 130 for the destination network address and virtual address range. The computing node 102 may use any technique to search the association table 130. For example, the host fabric interface 128 may search the association table 130 for an association entry matching the destination process identifier and the virtual address range. By matching both network address and virtual memory address, the computing node 102 may better support multithreaded programs that share a network address (e.g., an MPI rank or a process identifier) but use separate communication buffers for each thread. In block 410, the computing node 102 determines whether a matching association entry was found in the association table 130. If not, the method 400 branches to block 428, described below. If a matching association entry was found in the association table 130, the method 400 branches to block 412.

In block 412, the computing node 102 determines the destination processor core 122 based on the matching association entry in the association table 130. Each association entry of the association table 130 may associate a particular network address (e.g., a particular process identifier) and virtual memory address to a processor core 122 identifier. As described above in connection with FIG. 3, the computing node 102 may automatically update the contents of the association table 130 based on past communication activity of the processor cores 122. In some embodiments, the host fabric interface 128 may identify the destination processor core 122 based on the association entry of the association table 130. Additionally, in some embodiments the computing node 102 may update a timestamp associated with the association entry, which may be used to identify old association entries as described above in connection with FIG. 3.

In block 414, the computing node 102 causes the data transfer agent 126 associated with the destination processor core 122 to receive the message data. As described above, each data transfer agent 126 may be embodied as hardware, firmware, and/or software incorporated in or associated with a particular processor core 122 and capable of placing data in the private cache 124 of the associated processor core 122. In some embodiments, the host fabric interface 128 may engage the data transfer agent 126, for example by issuing one or more hardware or software commands to the data transfer agent 126.

In block 416, the computing node 102 determines a destination memory hierarchy level for the incoming message data. As described above, the computing node 102 includes a hierarchy of memory storage at various logical distances from the processor cores 122. For example, the computing node 102 may include a private cache 124 relatively near each processor core 122, system memory 134 relatively far from each processor core 122, shared last-level cache at an intermediate distance from each processor core 122, or other memory storage. Thus, in some embodiments, the computing node 102 may determine to place the incoming data in the private cache 124 associated with the destination processor core 122. In some embodiments, in block 418, the computing node 102 may apply one or more cache placement policies to determine the destination memory hierarchy level. Each cache placement policy may identify particular memory hierarchy levels or combinations of memory hierarchy levels based on process identifier and virtual address range. In some embodiments, the cache placement policies may be configured by software, for example by a user process, by an operation system, or by communications middleware. For example, the cache placement policies may be configured by one or more users of the computing node 102. In some embodiments, cache placement policies may include additional or more complicated rules. For example, the computing node 102 may place incoming data in the private cache 124 unless the destination location in the private cache 124 already includes modified data. As another example, if the incoming message data is larger than the private cache 124, the computing node 102 may place part of the incoming data (e.g., the first part) in the private cache 124 and the rest in the memory 134 or in a shared cache. In some embodiments, the data transfer agent 126 may determine the memory hierarchy level for the incoming message data.

In block 420, the computing node 102 places the incoming data at the destination memory hierarchy level. The data transfer agent 126 may copy, move, or otherwise place the data at the destination memory hierarchy level. In block 422, in some embodiments, the computing node 102 places the message data in the private cache 124 associated with the destination processor node 122. In some embodiments, the computing node 102 may transfer the incoming data directly from the host fabric interface 128, without storing an additional copy of the data in the memory 134. Direct placement in the private cache 124 may improve performance by reducing access latency or eliminating cache misses. After being placed in the private cache 124, the message data may propagate to other processor cores 122 and/or to the memory 134 using a cache coherency protocol of the processor 120. Thus, placing the message data in a private cache 124 associated with a processor core 122 that is no longer the proper destination of the message data (e.g., as a result of process migration to another processor core 122, a stale association entry in the association table 130, or otherwise) may not result in incorrect behavior, but may negatively impact performance.

In some embodiments, in block 424, the computing node 102 places the message data in a shared cache such as a shared L3 cache or a shared last-level cache. In that example, the message data may be accessed by any of the processor cores 122, but access may require one or more cache misses and/or additional latency compared to accessing the private cache 124. As described above, the computing node 102 may place the message data in the shared cache based on one or more cache placement policies, if the private cache 124 is full or contains modified data, or for any other reason. Similarly, in some embodiments in block 426, the computing node 102 may place the message data in the system memory 134. When stored in the system memory 134, the message data may be accessed by any of the processor cores 122, but access may require one or more cache misses and/or additional latency compared to accessing the private cache 124. Placing the message data in the system memory 134 may be appropriate for computing nodes 102 that include a processor 120 without any shared cache. After placing the incoming message data, the method 400 loops back to block 402 to monitor for additional incoming message data.

Referring back to block 410, if the association table 130 does not include an association entry for the destination process identifier and virtual address range, the method 400 branches to block 428. In block 428, the computing node 102 places the incoming message data in memory of the computing node 102 that is shared by the processor cores 122, allowing any of the processor cores 122 to access the message data. In some embodiments, the host fabric interface 128 may place the incoming message data in the shared memory, for example by moving or copying the incoming message data to the appropriate destination location. In some embodiments, in block 430 the computing node 102 places the incoming data in the system memory 134. Placing the incoming data in the system memory 134 may be highly compatible with different hardware and software. For example, placing the incoming data in the system memory 134 may be compatible with processors 120 that do not include shared cache. In some embodiments, in block 432 the computing node 102 places the incoming data in a shared cache, such as a shared L3 cache or a shared last-level cache. Placing the incoming data in a shared cache may increase performance over placing the incoming data in the system memory 134 while still being accessible by any of the processor cores 122. After placing the incoming data in the shared memory, the method 400 loops back to block 402 to continue monitoring for incoming message data.

It should be appreciated that, in some embodiments, the method 300 and/or 400 may be embodied as various instructions stored on a computer-readable media, which may be executed by the processor 120, various cores 122 of the processor 120, and/or other components of each computing node 102 to cause the respective computing device 102 perform the method 300 and/or 400. The computer-readable media may be embodied as any type of media capable of being read by the computing node 102 including, but not limited to, the memory 134, the data storage 136, local memory of the processor 120 such as the private cache(s) 124, other memory or data storage devices of the computing node 102, portable media readable by a peripheral device of the computing node 102, and/or other media.

EXAMPLES

Illustrative examples of the technologies disclosed herein are provided below. An embodiment of the technologies may include any one or more, and any combination of, the examples described below.

Example 1 includes a computing device for data communication, the computing device comprising a plurality of processor cores; and a host fabric interface to (i) receive a first message via a communication interface, (ii) determine whether an association table includes a first entry, wherein the first entry associates one or more parameters of the first message to a destination processor core of the plurality of processor cores, and (iii) cause a data transfer agent associated with the destination processor core to obtain message data of the first message in response to a determination that the association table includes the first entry.

Example 2 includes the subject matter of Example 1, and wherein to determine whether the association table includes the first entry comprises to determine a first network address and a first virtual address range based on the first message; and search the association table for the first network address and the first virtual address range to identify the destination processor core.

Example 3 includes the subject matter of any of Examples 1 and 2, and wherein the host fabric interface is further to store the message data in a shared memory accessible by the plurality of processor cores in response to a determination that the association table does not include the first entry.

Example 4 includes the subject matter of any of Examples 1-3, and wherein the shared memory comprises a system memory or a shared cache memory.

Example 5 includes the subject matter of any of Examples 1-4, and wherein the data transfer agent is further to store the message data at a destination memory hierarchy level in response to an obtaining of the message data.

Example 6 includes the subject matter of any of Examples 1-5, and wherein to store the message data comprises to store the message data in a private cache associated with the destination processor core.

Example 7 includes the subject matter of any of Examples 1-6, and wherein the data transfer agent is further to determine the destination memory hierarchy level based on a cache placement policy, wherein the cache placement policy defines a memory hierarchy level based on a network address and a virtual address range.

Example 8 includes the subject matter of any of Examples 1-7, and wherein the cache placement policy is configurable by a user of the computing device.

Example 9 includes the subject matter of any of Examples 1-8, and wherein the data transfer agent is further to determine the destination memory hierarchy level based on a determination of whether a first virtual address range associated with the first message is modified in a private cache associated with the destination processor core.

Example 10 includes the subject matter of any of Examples 1-9, and wherein the host fabric interface is further to intercept a first communication operation, wherein the first communication operation is originated by a thread executed by the destination processor core; determine, in response to interception of the first communication operation, a first network address of the thread executed by the destination processor core and a first virtual address range of the first communication operation; and add the first entry to the association table, wherein the first entry associates the first network address and the first virtual address range to the destination processor core.

Example 11 includes the subject matter of any of Examples 1-10, and wherein the host fabric interface is further to determine whether the association table is full; and remove an old association from the association table in response to a determination that the association table is full.

Example 12 includes the subject matter of any of Examples 1-11, and wherein the host fabric interface is further to update a timestamp associated with the first entry in response to the determination that the association table includes the first entry.

Example 13 includes the subject matter of any of Examples 1-12, and wherein the host fabric interface is further to determine, in response to the interception of the first communication operation, whether the association table includes a second entry that associates the first network address and the first virtual address range to a second processor core; and update the second entry to associate the first network address and the first virtual address range to the destination processor core in response to a determination that the association table includes the second entry.

Example 14 includes the subject matter of any of Examples 1-13, and wherein the host fabric interface is further to determine, in response to the interception of the first communication operation, whether the association table includes a second entry that associates a second network address and the first virtual address range to a processor core; and update the second entry to associate the first network address and the first virtual address range to the destination processor core in response to a determination that the association table includes the second entry.

Example 15 includes the subject matter of any of Examples 1-14, and wherein the host fabric interface is further to receive a command from software of the computing device; and update the association table in response to receipt of the command.

Example 16 includes the subject matter of any of Examples 1-15, and further including a processor, wherein the processor includes the plurality of processor cores and the host fabric interface.

Example 17 includes the subject matter of any of Examples 1-16, and wherein the host fabric interface comprises the communication interface.

Example 18 includes the subject matter of any of Examples 1-17, and wherein the destination processor core comprises the data transfer agent.

Example 19 includes a method for data communication, the method comprising receiving, by a host fabric interface of a computing device, a first message via a communication interface; determining, by the host fabric interface, whether an association table includes a first entry, wherein the first entry associates one or more parameters of the first message to a destination processor core of a plurality of processor cores of the computing device; and causing, by the host fabric interface, a data transfer agent associated with the destination processor core to obtain message data of the first message in response to determining the association table includes the first entry.

Example 20 includes the subject matter of Example 19, and wherein determining whether the association table includes the first entry comprises determining a first network address and a first virtual address range based on the first message; and searching the association table for the first network address and the first virtual address range to identify the destination processor core.

Example 21 includes the subject matter of any of Examples 19 and 20, and further including storing, by the host fabric interface, the message data in a shared memory accessible by the plurality of processor cores in response to determining that the association table does not include the first entry.

Example 22 includes the subject matter of any of Examples 19-21, and wherein storing the message data in the shared memory comprises storing the message data in a system memory or a shared cache memory.

Example 23 includes the subject matter of any of Examples 19-22, and further including storing, by the computing device, the message data at a destination memory hierarchy level in response to causing the data transfer agent to obtain the message data.

Example 24 includes the subject matter of any of Examples 19-23, and wherein storing the message data comprises storing the message data in a private cache associated with the destination processor core.

Example 25 includes the subject matter of any of Examples 19-24, and further including determining, by the computing device, the destination memory hierarchy level based on a cache placement policy, wherein the cache placement policy defines a memory hierarchy level based on a network address and a virtual address range.

Example 26 includes the subject matter of any of Examples 19-25, and wherein the cache placement policy is configurable by a user of the computing device.

Example 27 includes the subject matter of any of Examples 19-26, and wherein determining the destination memory hierarchy level further comprises determining whether a first virtual address range associated with the first message is modified in a private cache associated with the destination processor core.

Example 28 includes the subject matter of any of Examples 19-27, and further including intercepting, by the host fabric interface, a first communication operation, wherein the first communication operation is originated by a thread executed by the destination processor core; determining, by the host fabric interface in response to intercepting the first communication operation, a first network address of the thread executed by the destination processor core and a first virtual address range of the first communication operation; and adding, by the host fabric interface, the first entry to the association table, wherein the first entry associates the first network address and the first virtual address range to the destination processor core.

Example 29 includes the subject matter of any of Examples 19-28, and further including determining, by the host fabric interface, whether the association table is full; and removing, by the host fabric interface, an old association from the association table in response to determining the association table is full.

Example 30 includes the subject matter of any of Examples 19-29, and further including updating, by the host fabric interface, a timestamp associated with the first entry in response to determining the association table includes the first entry.

Example 31 includes the subject matter of any of Examples 19-30, and further including determining, by the host fabric interface in response to intercepting the first communication operation, whether the association table includes a second entry that associates the first network address and the first virtual address range to a second processor core; and updating, by the host fabric interface, the second entry to associate the first network address and the first virtual address range to the destination processor core in response to determining that the association table includes the second entry.

Example 32 includes the subject matter of any of Examples 19-31, and further including determining, by the host fabric interface in response to intercepting the first communication operation, whether the association table includes a second entry that associates a second network address and the first virtual address range to a processor core; and updating, by the host fabric interface, the second entry to associate the first network address and the first virtual address range to the destination processor core in response to determining that the association table includes the second entry.

Example 33 includes the subject matter of any of Examples 19-32, and further including receiving, by the host fabric interface, a command from software of the computing device; and updating, by the host fabric interface, the association table in response to receiving the command.

Example 34 includes the subject matter of any of Examples 19-33, and wherein a processor of the computing device comprises the host fabric interface.

Example 35 includes the subject matter of any of Examples 19-34, and wherein the host fabric interface comprises the communication interface.

Example 36 includes the subject matter of any of Examples 19-35, and wherein the destination processor core comprises the data transfer agent.

Example 37 includes a computing device comprising a processor; and a memory having stored therein a plurality of instructions that when executed by the processor cause the computing device to perform the method of any of Examples 19-36.

Example 38 includes one or more machine readable storage media comprising a plurality of instructions stored thereon that in response to being executed result in a computing device performing the method of any of Examples 19-36.

Example 39 includes a computing device comprising means for performing the method of any of Examples 19-36.

Example 40 includes a computing device for data communication, the computing device comprising means for receiving, by a host fabric interface of the computing device, a first message via a communication interface; means for determining, by the host fabric interface, whether an association table includes a first entry, wherein the first entry associates one or more parameters of the first message to a destination processor core of a plurality of processor cores of the computing device; and means for causing, by the host fabric interface, a data transfer agent associated with the destination processor core to obtain message data of the first message in response to determining the association table includes the first entry.

Example 41 includes the subject matter of Example 40, and wherein the means for determining whether the association table includes the first entry comprises means for determining a first network address and a first virtual address range based on the first message; and means for searching the association table for the first network address and the first virtual address range to identify the destination processor core.

Example 42 includes the subject matter of any of Examples 40 and 41, and further including means for storing, by the host fabric interface, the message data in a shared memory accessible by the plurality of processor cores in response to determining that the association table does not include the first entry.

Example 43 includes the subject matter of any of Examples 40-42, and wherein the means for storing the message data in the shared memory comprises means for storing the message data in a system memory or a shared cache memory.

Example 44 includes the subject matter of any of Examples 40-43, and further including means for storing the message data at a destination memory hierarchy level in response to causing the data transfer agent to obtain the message data.

Example 45 includes the subject matter of any of Examples 40-44, and wherein the means for storing the message data comprises means for storing the message data in a private cache associated with the destination processor core.

Example 46 includes the subject matter of any of Examples 40-45, and further including means for determining the destination memory hierarchy level based on a cache placement policy, wherein the cache placement policy defines a memory hierarchy level based on a network address and a virtual address range.

Example 47 includes the subject matter of any of Examples 40-46, and wherein the cache placement policy is configurable by a user of the computing device.

Example 48 includes the subject matter of any of Examples 40-47, and wherein the means for determining the destination memory hierarchy level further comprises means for determining whether a first virtual address range associated with the first message is modified in a private cache associated with the destination processor core.

Example 49 includes the subject matter of any of Examples 40-48, and further including means for intercepting, by the host fabric interface, a first communication operation, wherein the first communication operation is originated by a thread executed by the destination processor core; means for determining, by the host fabric interface in response to intercepting the first communication operation, a first network address of the thread executed by the destination processor core and a first virtual address range of the first communication operation; and means for adding, by the host fabric interface, the first entry to the association table, wherein the first entry associates the first network address and the first virtual address range to the destination processor core.

Example 50 includes the subject matter of any of Examples 40-49, and further including means for determining, by the host fabric interface, whether the association table is full; and means for removing, by the host fabric interface, an old association from the association table in response to determining the association table is full.

Example 51 includes the subject matter of any of Examples 40-50, and further including means for updating, by the host fabric interface, a timestamp associated with the first entry in response to determining the association table includes the first entry.

Example 52 includes the subject matter of any of Examples 40-51, and further including means for determining, by the host fabric interface in response to intercepting the first communication operation, whether the association table includes a second entry that associates the first network address and the first virtual address range to a second processor core; and means for updating, by the host fabric interface, the second entry to associate the first network address and the first virtual address range to the destination processor core in response to determining that the association table includes the second entry.

Example 53 includes the subject matter of any of Examples 40-52, and further including means for determining, by the host fabric interface in response to intercepting the first communication operation, whether the association table includes a second entry that associates a second network address and the first virtual address range to a processor core; and means for updating, by the host fabric interface, the second entry to associate the first network address and the first virtual address range to the destination processor core in response to determining that the association table includes the second entry.

Example 54 includes the subject matter of any of Examples 40-53, and further including means for receiving, by the host fabric interface, a command from software of the computing device; and means for updating, by the host fabric interface, the association table in response to receiving the command.

Example 55 includes the subject matter of any of Examples 40-54, and wherein a processor of the computing device comprises the host fabric interface.

Example 56 includes the subject matter of any of Examples 40-55, and wherein the host fabric interface comprises the communication interface.

Example 57 includes the subject matter of any of Examples 40-56, and wherein the destination processor core comprises the data transfer agent.

Example 58 includes a computing device for data communication, the computing device comprising a plurality of processor cores; and a host fabric interface, wherein the host fabric interface comprises communication monitoring circuitry to receive a first message via a communication interface; and association table circuitry to (i) determine whether an association table includes a first entry, wherein the first entry associates one or more parameters of the first message to a destination processor core of the plurality of processor cores, and (ii) cause data transfer agent circuitry associated with the destination processor core to obtain message data of the first message in response to a determination that the association table includes the first entry.

Example 59 includes the subject matter of Example 58, and wherein to determine whether the association table includes the first entry comprises to determine a first network address and a first virtual address range based on the first message; and search the association table for the first network address and the first virtual address range to identify the destination processor core.

Example 60 includes the subject matter of any of Examples 58 and 59, and wherein the data transfer agent circuitry is further to store the message data at a destination memory hierarchy level in response to an obtaining of the message data.

Example 61 includes the subject matter of any of Examples 58-60, and wherein to store the message data comprises to store the message data in a private cache associated with the destination processor core.

Example 62 includes the subject matter of any of Examples 58-61, and wherein the data transfer agent circuitry is further to determine the destination memory hierarchy level based on a cache placement policy, wherein the cache placement policy defines a memory hierarchy level based on a network address and a virtual address range.

Example 63 includes the subject matter of any of Examples 58-62, and wherein the host fabric interface further comprises command monitoring circuitry to intercept a first communication operation, wherein the first communication operation is originated by a thread executed by the destination processor core; and the association table circuitry is further to determine, in response to interception of the first communication operation, a first network address of the thread executed by the destination processor core and a first virtual address range of the first communication operation; and add the first entry to the association table, wherein the first entry associates the first network address and the first virtual address range to the destination processor core.

Example 64 includes the subject matter of any of Examples 58-63, and wherein the association table circuitry is further to determine, in response to the interception of the first communication operation, whether the association table includes a second entry that associates the first network address and the first virtual address range to a second processor core; and update the second entry to associate the first network address and the first virtual address range to the destination processor core in response to a determination that the association table includes the second entry.

Example 65 includes the subject matter of any of Examples 58-64, and wherein the association table circuitry is further to determine, in response to the interception of the first communication operation, whether the association table includes a second entry that associates a second network address and the first virtual address range to a processor core; and update the second entry to associate the first network address and the first virtual address range to the destination processor core in response to a determination that the association table includes the second entry.

Example 66 includes the subject matter of any of Examples 58-65, and further including a processor, wherein the processor includes the plurality of processor cores and the host fabric interface.

Example 67 includes the subject matter of any of Examples 58-66, and wherein the host fabric interface comprises the communication interface.

Example 68 includes the subject matter of any of Examples 58-67, and wherein the destination processor core comprises the data transfer agent circuitry.

The invention claimed is:

1. A computing device for data communication, the computing device comprising:
   a plurality of processor cores;
   a data transfer agent; and
   a host fabric interface to:
   receive, via a communication interface connected to a network, a first message from another computing device connected to the network;
   determine whether an association table that associates network addresses and virtual memory addresses with each of the processor cores includes a first entry, wherein the first entry associates one or more parameters of the first message to a destination processor core of the plurality of processor cores;
   cause a data transfer agent associated with the destination processor core to obtain message data of the first message in response to a determination that the association table includes the first entry;
   wherein the data transfer agent is to:
   determine whether a private cache that is accessible by the destination processor core and inaccessible by the other processor cores of the plurality of processor cores includes modified data; and
   write, in response to a determination that the private cache does not include modified data, the message data from the other computing device to the private cache.

2. The computing device of claim 1, wherein to determine whether the association table includes the first entry comprises to:
   determine a first network address and a first virtual address range based on the first message; and
   search the association table for the first network address and the first virtual address range to identify the destination processor core.

3. The computing device of claim 1, wherein the host fabric interface is further to:
   intercept a first communication operation, wherein the first communication operation is originated by a thread executed by the destination processor core;
   determine, in response to interception of the first communication operation, a first network address of the thread executed by the destination processor core and a first virtual address range of the first communication operation; and
   add the first entry to the association table, wherein the first entry associates the first network address and the first virtual address range to the destination processor core.

4. The computing device of claim 3, wherein the host fabric interface is further to:
   determine, in response to the interception of the first communication operation, whether the association table includes a second entry that associates the first network address and the first virtual address range to a second processor core; and
   update the second entry to associate the first network address and the first virtual address range to the destination processor core in response to a determination that the association table includes the second entry.

5. The computing device of claim 3, wherein the host fabric interface is further to:
   determine, in response to the interception of the first communication operation, whether the association table includes a second entry that associates a second network address and the first virtual address range to a processor core; and
   update the second entry to associate the first network address and the first virtual address range to the destination processor core in response to a determination that the association table includes the second entry.

6. The computing device of claim 1, further comprising a processor, wherein the processor includes the plurality of processor cores and the host fabric interface.

7. The computing device of claim 1, wherein the host fabric interface comprises the communication interface.

8. The computing device of claim 1, wherein the destination processor core comprises the data transfer agent.

9. The computing device of claim 1, wherein the data transfer agent is further to write, in response to a determination that the private cache does include modified data, the message data to one of a shared cache that is accessible to the plurality of cores or a system memory.

10. A method for data communication, the method comprising:
    receiving, by a host fabric interface of a computing device and via a communication interface connected to a network, a first message from another computing device connected to the network;
    determining, by the host fabric interface, whether an association table that associates network addresses and virtual memory addresses with each of a plurality of processor cores includes a first entry, wherein the first entry associates one or more parameters of the first message to a destination processor core of the plurality of processor cores of the computing device;
    causing, by the host fabric interface, a data transfer agent associated with the destination processor core to obtain message data of the first message in response to determining the association table includes the first entry;
    determining, by the data transfer agent, whether a private cache that is accessible by the destination processor core and inaccessible by the other processor cores of the plurality of processor cores includes modified data; and
    writing, in response to a determination that the private cache does not include modified data and by the data transfer agent, the message data from the other computing device to the private cache.

11. The method of claim 10, wherein determining whether the association table includes the first entry comprises:
    determining a first network address and a first virtual address range based on the first message; and
    searching the association table for the first network address and the first virtual address range to identify the destination processor core.

12. The method of claim 10, further comprising:
intercepting, by the host fabric interface, a first communication operation, wherein the first communication operation is originated by a thread executed by the destination processor core;
determining, by the host fabric interface in response to intercepting the first communication operation, a first network address of the thread executed by the destination processor core and a first virtual address range of the first communication operation; and
adding, by the host fabric interface, the first entry to the association table, wherein the first entry associates the first network address and the first virtual address range to the destination processor core.

13. The method of claim 12, further comprising:
determining, by the host fabric interface in response to intercepting the first communication operation, whether the association table includes a second entry that associates the first network address and the first virtual address range to a second processor core; and
updating, by the host fabric interface, the second entry to associate the first network address and the first virtual address range to the destination processor core in response to determining that the association table includes the second entry.

14. The method of claim 12, further comprising:
determining, by the host fabric interface in response to intercepting the first communication operation, whether the association table includes a second entry that associates a second network address and the first virtual address range to a processor core; and
updating, by the host fabric interface, the second entry to associate the first network address and the first virtual address range to the destination processor core in response to determining that the association table includes the second entry.

15. One or more non-transitory computer-readable storage media comprising a plurality of instructions that in response to being executed cause a computing device to:
receive, by a host fabric interface of the computing device and via a communication interface connected to a network, a first message from another computing device connected to the network;
determine, by the host fabric interface, whether an association table that associates network addresses and virtual memory addresses with each of a plurality of processor cores includes a first entry, wherein the first entry associates one or more parameters of the first message to a destination processor core of the plurality of processor cores of the computing device;
cause, by the host fabric interface, a data transfer agent associated with the destination processor core to obtain message data of the first message in response to determining the association table includes the first entry;
determine, by the data transfer agent, whether a private cache that is accessible by the destination processor core and inaccessible by the other processor cores of the plurality of processor cores includes modified data; and
write, in response to a determination that the private cache does not include modified data and by the data transfer agent, the message data from the other computing device to the private cache.

16. The one or more non-transitory computer-readable storage media of claim 15, wherein to determine whether the association table includes the first entry comprises to:
determine a first network address and a first virtual address range based on the first message; and
search the association table for the first network address and the first virtual address range to identify the destination processor core.

17. The one or more non-transitory computer-readable storage media of claim 15, further comprising a plurality of instructions that in response to being executed cause the computing device to:
intercept, by the host fabric interface, a first communication operation, wherein the first communication operation is originated by a thread executed by the destination processor core;
determine, by the host fabric interface in response to intercepting the first communication operation, a first network address of the thread executed by the destination processor core and a first virtual address range of the first communication operation; and
add, by the host fabric interface, the first entry to the association table, wherein the first entry associates the first network address and the first virtual address range to the destination processor core.

18. The one or more non-transitory computer-readable storage media of claim 17, further comprising a plurality of instructions that in response to being executed cause the computing device to:
determine, by the host fabric interface in response to intercepting the first communication operation, whether the association table includes a second entry that associates the first network address and the first virtual address range to a second processor core; and
update, by the host fabric interface, the second entry to associate the first network address and the first virtual address range to the destination processor core in response to determining that the association table includes the second entry.

19. The one or more non-transitory computer-readable storage media of claim 17, further comprising a plurality of instructions that in response to being executed cause the computing device to:
determine, by the host fabric interface in response to intercepting the first communication operation, whether the association table includes a second entry that associates a second network address and the first virtual address range to a processor core; and
update, by the host fabric interface, the second entry to associate the first network address and the first virtual address range to the destination processor core in response to determining that the association table includes the second entry.

* * * * *